Patented June 24, 1941

2,247,124

UNITED STATES PATENT OFFICE 2,247,124

CUPROAMMONIUM CELLULOSE SPINNING SOLUTION AND METHOD OF PREPARING THE SAME

William H. Furness, Riverton, N. J., assignor to American Rayon Company, Inc., Riverton, N. J., a corporation of New Jersey No Drawing. Application December 24, 1937, Serial No. 181,720, which is a division of application Serial No. 90,920, July 16, 1936. Divided and this application November 24, 1939, Serial No. 305,928

4 Claims. (Cl. 106—40)

This invention relates to a cuproammonium cellulose spinning solution and method of preparing the same, and it is a division of my copending application Serial No. 181,720, filed December 24, 1937, the latter in turn being a division of application Serial No. 90,920, filed July 16, 1936, now Patent No. 2,111,531, in turn a continuation of my application Serial No. 1,901, filed January 15, 1935.

The primary object of the invention is to provide a simple and effective method of making a cuproammonium cellulosic spinning solution having the advantages hereinafter pointed out.

I will first describe the method of making the solvent solution.

I prepare the solution preferably as follows: Dissolve 160.7 ounces of copper sulphate

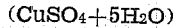

$(CuSO_4 + 5H_2O)$ in 21.5 liters of water. Add 8 liters aqua ammonia (26° Bé.) and agitate until the basic copper sulphate first formed is redissolved. Cool the solution to about 15° C. Any iron which is present will quickly settle and may be easily removed. Pour into a mixer and add 12 lbs. of ice, preferably cracked.

Dissolve 52.5 ounces caustic soda (76% $Na_2O$) in 6 liters of water, cool to about 15° C.; and add 3 lbs. of cracked ice.

Stir each solution until the ice is nearly melted which will simultaneously cool and dilute, bringing the temperature of each to about 4° C. Pour the solutions together and agitate for about 30 seconds, which lowers the temperature below 0° C.

The advantage of cooling with ice is that the cooling occurs at the point of dilution which prevents crystallization as the cooling occurs and secures rapid cooling in large volumes.

Then immediately add 100 ounces of bleached cotton linters and mix. The solution of the cellulose, with such temperature, will be complete within about 20 minutes and a perfectly clear solution will be obtained entirely free from undissolved fiber and precipitated copper hydroxide.

The proportions of chemicals and the dilutions are important and cannot be greatly varied from. The limits of variation may be determined from such considerations as the following: If less water is used in the first solution, crystals of copper tetrammonia sulphate will be formed when the solution is cooled. Should this occur, the solution of the cotton will not be complete in the final mixture. If less water is used in dissolving the caustic soda a tendency to precipitate copper hydroxide from the solution will be observed. It is an important point in the method that no precipitation occurs in the solvent solution. The cotton is immediately attacked by the liquid solvent, whereas in methods employing precipitated copper hydroxide, the hydroxide dissolves coincidentally with the cellulose, the mutual solution proceeding with less and less rapidity so that in the finished solution there is always some residue of undissolved copper hydroxide and undissolved fiber, which greatly increases the difficulty of filtration. When the copper and caustic soda solutions described are reduced to a temperature below 4° C. and mixed together, no precipitation of copper hydroxide will occur, and there will be no rise in temperature. A change in color occurs, the solution becoming a much darker blue. Until further chemical investigation, I assume that under the conditions stated and with the proportion of chemicals given, a double soluble compound is formed which is sufficiently stable to permit of complete solution of the cotton fiber before precipitation of copper hydroxide occurs, such precipitation being entirely prevented by the formation of a soluble copper cellulose ammonia compound.

The resulting cellulose solution will contain sodium sulphate corresponding to the amount of caustic soda used, and I believe that this sodium sulphate is not immediately formed when the solutions are mixed, but forms after the cellulose is added and has taken up the copper from the solution.

I do not know whether I am correct in the belief that I form a double salt of copper ammonia and caustic soda. In any event, I believe I form some temporary compound in which there is no copper hydroxide present and which, because it is not stable, I believe to be very active. I know that an excess of caustic soda, as much as somewhere about 1%, cuts down the solvent power of my solution over 50%, whereas it does not cut down the solvent power of a solution containing copper hydroxide. I further know that in the instance above given, if I do not add the cellulose to the solution when cold, within about 15 minutes after its preparation, the cellulose will not "go up," which I attribute to the breaking down of whatever the temporary compound may be and to the formation of copper hydroxide. If, however, as specified, I add the cellulose immediately, it "goes up" and becomes completely dissolved in within 20 minutes even when the mixing is done in an ordinary vessel with beaters.

By way of contrast I know that when mixing copper hydroxide, ammonia and cellulose, to make a cellulosic spinning solution, it takes about 2½ hours of time and the mixture is a doughy mass which must be kneaded in a mill. What apparently occurs in that case is that the copper hydroxide dissolves, and as it dissolves more and more is put into solution along with the cellulose, and that the extended milling is required to strip off the dissolved cellulose to expose the undissolved cellulose to action of dissolved copper hydroxide. At best it is a time consuming procedure, as the relatively insoluble copper hydroxide dissolves slowly. Furthermore, in that case, I know there is always some undissolved cellulose and some undissolved copper hydroxide present in the ultimate solution. In contrast, when I add cellulose to my solution, the mixture can be readily stirred and the cellulose will go into complete solution in a short period of time with no undissolved fibers and with no undissolved copper hydroxide. With the case of the copper hydroxide, much filtering is required, while in my case filtering is a minor thing, largely to remove foreign matter. I further know that in making a spinning solution from copper hydroxide, ammonia and cellulose, as described, much more ammonia is needed than I employ, and after the cellulose solution has been made, it is customary to evaporate ammonia by a vacuum pump until the ammonia is down to about the content of that I employ. In other words, I am enabled to make the solution with about the ammonia content that was left in the older process after evaporation of ammonia. Apparently my solution acts on the fibers practically throughout and almost at once. I use substantially 2 mols of caustic soda to 1 mol of copper sulphate. If more caustic soda is used than there is a tendency toward the difficulties hereinbefore pointed out. If less is used, there is a loss in economy as less of the double salt is formed, the ammonia content, as it were, being relatively increased. In the example given, the caustic soda is the ordinary commercial article which usually contains some carbonate, for which allowance is made. If pure caustic soda is employed, then I use 2 mols of caustic soda to 1 of copper sulphate as giving the most effective and uniform results. In order to permit greater operating latitude in preparation of the solution, I prefer to add some ammonium sulphate to maintain the desired acid balance, from about 2 grams to 5 grams per liter.

It is to be noted that the low ammonia content is advantageous, not only from the standpoint of cost, but also because the solution may, if desired, be set in air and will require less chemicals in the precipitation in wet spinning. It will be seen from what has heretofore been said that this is about the amount which heretofore, in making cuproammonium solutions, has been employed to maintain the solution—an amount much less than has heretofore been employed in initially making the solution.

The cellulose solution can be readily produced in large quantities and is entirely stable at any ordinary atmospheric temperature and can be filtered through cotton cloth because there is no excess solvent present.

This method of manufacture of copper ammonia cellulose solution has important advantages over previously known methods in cost of raw materials, in the cost, size and nature of the apparatus, and ease of manipulation. It possesses a distinct advantage over methods involving the use of solid precipitates, such as copper hydroxide or basic copper sulphate, inasmuch as these precipitates are never entirely dissolved, and some fraction of them always remains in the solution, causing, inter alia, difficulty in filtration, disadvantages not incident to my method.

While I prefer using some of the water in the system in the form of ice to obtain the needed refrigeration, the refrigeration may otherwise be employed. In this connection the important point is that the cellulose is added to the cold solvent solution immediately when the latter is prepared and while the solution is in temporary, unstable equilibrium within the compound heretofore referred to and before the reaction proceeds to formation of appreciable visible copper hydroxide and the formation of sodium sulphate. Under these conditions the cellulose "goes up," otherwise it will not. While 4 mols of ammonia are theoretically required, I find that it is necessary to use almost twice that quantity to get the results. I use preferably from substantially 7.1 to substantially 7.8 mols of ammonia. Approximately 7 mols of ammonia is the critical minimum. More than approximately 8 mols is undesirable for reasons heretofore given, although some excess over the critical minimum may be tolerated.

I have successfully substituted for the copper sulphate, copper chloride, copper nitrate and copper carbonate.

What I claim is:

1. The process of preparing a cellulose solution for the spinning of rayon, which comprises preparing a solution from copper sulphate, water and ammonia and cooling it to substantially 4° C., preparing a caustic soda solution, cooling it to substantially 4° C., mixing the two solutions while in their cold state and lowering the temperature to 0° C. or below, the proportions of chemicals employed being copper sulphate 1 mol, ammonia from substantially 7.1 to substantially 7.8 mols, caustic soda 2 mols, and substantially 39.5 liters of water; and subjecting cellulose to the ultimate solution immediately upon its preparation and while it is in a state of temporary, unstable equilibrium and before the formation of appreciable visible copper hydroxide and of sodium sulphate.

2. In the process of claim 1, the employment of some of the water in the form of ice.

3. The process of preparing a cellulose solution for the spinning of rayon which comprises preparing a solution of copper sulphate, ammonia and water in the following proportions, i. e., 160.7 ounces of copper sulphate, 8 liters of aqua ammonia (26° Bé.), and substantially 27 liters of water, and cooling said solution to substantially 4° C.; preparing a caustic soda solution in the following proportions, 52.5 ounces caustic soda (76% $Na_2O$) and substantially 7.4 liters of water, and cooling said solution to substantially 4° C.; mixing said two solutions while in their cold state and lowering their temperature to substantially 0° C. or lower; and subjecting cellulose to the ultimate solution immediately upon its preparation and while it is in a state of temporary, unstable equilibrium and before the formation of appreciable visible copper hydroxide and of sodium sulphate.

4. The process of claim 3 in which part of the water used in preparing each of the first two solutions is employed in the form of ice.

WILLIAM H. FURNESS.